(12) United States Patent
Yamatani

(10) Patent No.: US 9,616,765 B2
(45) Date of Patent: Apr. 11, 2017

(54) HEAT ELEMENT COOLING DEVICE

(75) Inventor: Eiji Yamatani, Saitama (JP)

(73) Assignee: CALSONIC KANSEI CORPORATION, Saitama-shi (JP)

( * ) Notice: Subject to any disclaimer, the term of this patent is extended or adjusted under 35 U.S.C. 154(b) by 859 days.

(21) Appl. No.: 13/583,807

(22) PCT Filed: Jan. 6, 2011

(86) PCT No.: PCT/JP2011/050087
§ 371 (c)(1),
(2), (4) Date: Sep. 10, 2012

(87) PCT Pub. No.: WO2011/114756
PCT Pub. Date: Sep. 22, 2011

(65) Prior Publication Data
US 2013/0000864 A1    Jan. 3, 2013

(30) Foreign Application Priority Data

Mar. 18, 2010 (JP) ................................ 2010-062980

(51) Int. Cl.
*B60K 11/06* (2006.01)
*B60L 11/18* (2006.01)
(Continued)

(52) U.S. Cl.
CPC ...... *B60L 11/1874* (2013.01); *B60H 1/00278* (2013.01); *B60H 1/248* (2013.01);
(Continued)

(58) Field of Classification Search
CPC .. B60K 1/04; B60K 2001/0416; B60K 11/06; B60K 11/08; B60L 11/1874;
(Continued)

(56) References Cited

U.S. PATENT DOCUMENTS 4,942,806 A    7/1990  Hwang
5,167,573 A *  12/1992 Kanno ............... B60H 1/00428
                                                      454/141
(Continued)

FOREIGN PATENT DOCUMENTS

CN    101282852    10/2008
DE    7015684 U    8/1970
(Continued)

OTHER PUBLICATIONS

Chinese Office Action of counterpart application No. 201180014624.3, dated Jul. 21, 2015, 4 pages.

*Primary Examiner* — Leonard R Leo
(74) *Attorney, Agent, or Firm* — Foley & Lardner LLP

(57) ABSTRACT

In a battery cooling device 1 that cools a battery 2 that is arranged in a battery accommodation space 5 by taking in the air in a passenger compartment 6 through an air intake port part 12 provided in a vehicle interior trim 7 and a first air intake pipe 13, the first air intake pipe 13 is provided with an auxiliary air intake port 31 that opens to a space 30 formed between the vehicle interior trim 7 and a vehicle interior panel 8 that is located at a passenger-compartment outer side of the vehicle interior trim 7.

13 Claims, 6 Drawing Sheets

(51) Int. Cl.
*B60K 1/04* (2006.01)
*B60H 1/00* (2006.01)
*B60H 1/24* (2006.01)
*H01M 10/625* (2014.01)
*H01M 10/6563* (2014.01)
*H01M 10/613* (2014.01)
*B60K 1/00* (2006.01)

(52) U.S. Cl.
CPC ............ *B60K 1/04* (2013.01); *B60L 11/1877* (2013.01); *B60L 11/1879* (2013.01); *H01M 10/613* (2015.04); *H01M 10/625* (2015.04); *H01M 10/6563* (2015.04); *B60H 2001/003* (2013.01); *B60K 2001/005* (2013.01); *B60K 2001/0416* (2013.01); *B60L 2240/34* (2013.01); *Y02T 10/7005* (2013.01); *Y02T 10/705* (2013.01)

(58) Field of Classification Search
CPC ............ B60L 11/1879; B60L 11/1892; B60H 1/00278; H01M 8/04007
USPC ......... 165/41, 42, 59; 429/120, 439; 454/75, 454/108, 109, 112, 141, 152, 155, 164, 454/165; 180/68.1, 68.2
See application file for complete search history.

(56) References Cited

U.S. PATENT DOCUMENTS

| | | | | |
|---|---|---|---|---|
| 6,220,383 | B1* | 4/2001 | Muraki | B60K 1/04 180/68.5 |
| 6,798,658 | B2* | 9/2004 | Takedomi | B60K 1/04 180/68.5 |
| 6,931,878 | B2* | 8/2005 | Kubota | B60H 1/00278 62/244 |
| 7,004,233 | B2* | 2/2006 | Hasegawa | H05K 7/20909 165/122 |
| 7,451,608 | B2* | 11/2008 | Kikuchi | B60H 1/00278 62/186 |
| 7,511,455 | B2* | 3/2009 | Yoneda | H01M 10/613 320/104 |
| 7,635,040 | B2* | 12/2009 | Seo | B60H 1/00278 180/68.1 |
| 7,905,307 | B2* | 3/2011 | Kubota | B60K 1/04 180/68.1 |
| 7,963,831 | B2* | 6/2011 | He | B60H 1/00278 180/68.1 |
| 8,187,736 | B2* | 5/2012 | Park | H01M 10/625 165/202 |
| 8,757,249 | B2* | 6/2014 | Bandai | B60H 1/00278 165/202 |
| 2003/0145978 | A1* | 8/2003 | Tsurushima et al. | 165/11.1 |
| 2006/0073378 | A1* | 4/2006 | Hamery | B60L 11/1874 429/120 |
| 2009/0088062 | A1* | 4/2009 | Major | B60H 1/00278 454/70 |
| 2009/0088064 | A1* | 4/2009 | Lin | B60H 1/248 454/75 |
| 2009/0152031 | A1* | 6/2009 | Lim | B60K 1/04 180/68.1 |
| 2009/0173471 | A1* | 7/2009 | Sakamoto | B60H 1/00278 165/41 |
| 2009/0176150 | A1* | 7/2009 | Yanaka | 429/120 |
| 2009/0260905 | A1 | 10/2009 | Shinmura | |
| 2009/0321042 | A1* | 12/2009 | Ono | 165/61 |

FOREIGN PATENT DOCUMENTS

| | | |
|---|---|---|
| DE | 3618569 A1 | 1/1987 |
| JP | 2003-079003 A | 3/2003 |
| JP | 2004-001683 A | 1/2004 |
| JP | 2006-117096 A | 5/2006 |
| JP | 2006-188182 A | 7/2006 |
| JP | 2006-224798 A | 8/2006 |
| JP | 4114478 B2 | 4/2008 |
| WO | WO 2009081764 A1 * | 7/2009 |

* cited by examiner

HEAT ELEMENT COOLING DEVICE

TECHNICAL FIELD

The present invention relates to a heat element cooling device that cools a heat element mounted on a vehicle.

BACKGROUND OF THE INVENTION

The Patent Reference 1 discloses a heat element cooling device provided with two air intake ports that are arranged over a seat surface, facing a passenger compartment, to cool a battery, functioning as a heating element, mounted on a floor of a luggage compartment at a vehicle-body rear portion of a motor vehicle.

REFERENCE(S) ON PRIOR ART

Patent Reference(s)

[Patent Reference 1] Japanese Patent No. 4114478

DISCLOSURE OF THE INVENTION

Problem(s) to be Solved by the Invention

In the above-described conventional technology, there is, however, a problem in that the air in the passenger compartment cannot be taken in in the case where the two air intake ports are blocked at the same time since the two air intake ports are exposed in the passenger compartment.

The object of the present invention is to provide a heat element cooling device that is capable of taking in the air in the passenger compartment in the case where the air intake ports that are exposed in the passenger compartment are blocked.

Means for Solving the Problems

In order to achieve the object, in the present invention, an auxiliary air intake port is provided in a space between a vehicle interior trim and a vehicle interior panel that is located at the vehicle outer side of the vehicle interior trim.

Effect of the Invention

Therefore, in the present invention, the air in the passenger compartment can be taken in through the auxiliary air intake port even in the case where the air intake port is blocked.

Figure 1:
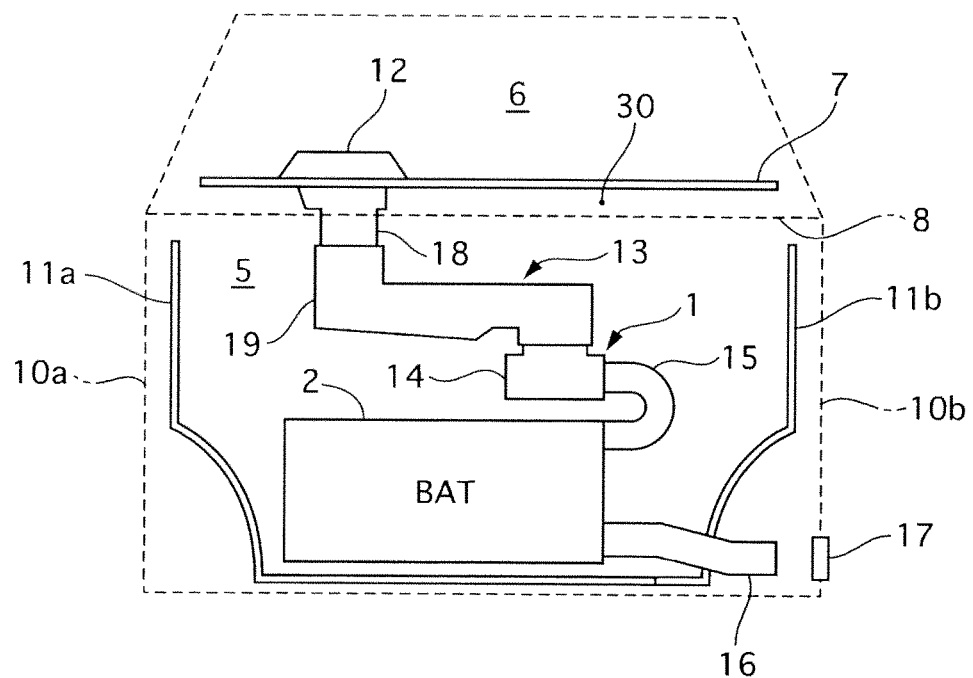
FIG. 1 is a rear view of a vehicle showing a battery cooling device of a first embodiment.

DESCRIPTION OF REFERENCE NUMBERS 1 battery cooling device (heat element cooling device)
2 battery (heat element)
3 rear seat
5 battery accommodation space (heat element accommodation space)
6 passenger compartment
7 vehicle interior trim
8 vehicle interior panel
13 first air intake duct
24 clearance
25 upper side member
30 space
31 auxiliary air intake port
32 valve member

BEST MODE FOR CARRYING OUT THE INVENTION

Hereinafter, an aspect of the invention to carry out the heat element cooling device of the present invention will be described based on the embodiments shown in drawings.

First Embodiment

First, a construction of a battery cooling device of the first embodiment will be described.

Figure 2:
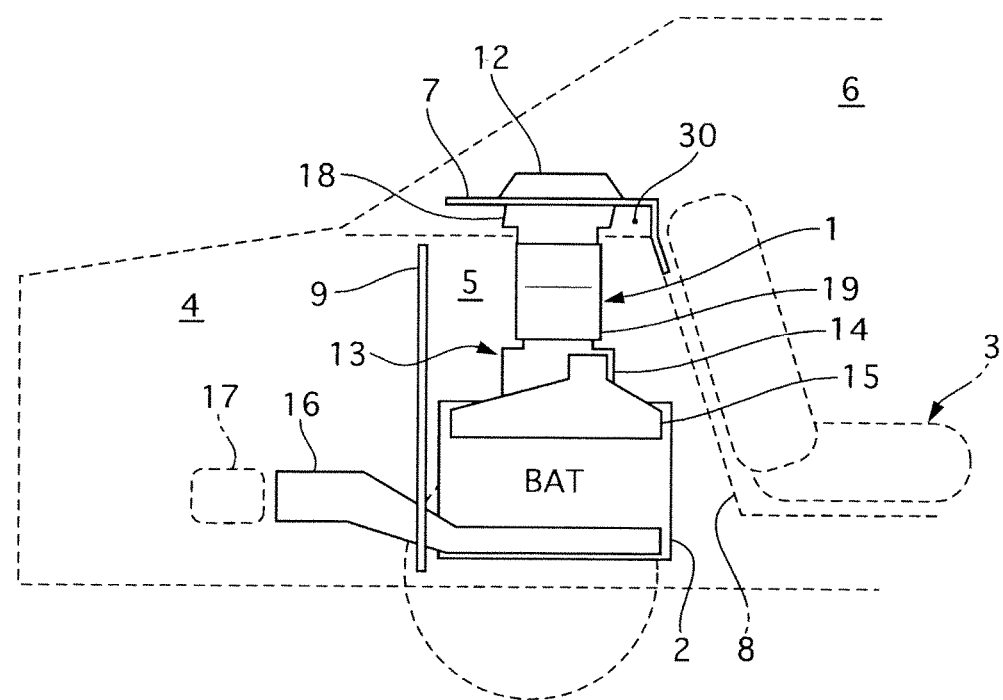
FIG. 2 is a right side view of the vehicle showing the battery cooling device of the first embodiment.

FIG. 1 is a rear view of a vehicle showing a battery cooling device of the first embodiment, and FIG. 2 is a right side view of the vehicle showing the battery cooling device of the first embodiment.

The battery cooling device (a heat element cooling device) 1 of the first embodiment is a device for cooling a strong electric battery (hereinafter referred to as a battery) 2 that supplies electric power to a drive motor of a hybrid electric vehicle or an electric vehicle. In the first embodiment, the battery 2 is arranged in a battery accommodation space (a heat element accommodation space) 5 that is arranged between a passenger compartment 6 and a luggage compartment 4, at the vehicle rear side of a rear seat 3 provided in the passenger compartment 6. The battery 2 has a construction containing a not-shown battery module, as a heat element, in a rectangular case shown in FIG. 1 and FIG. 2.

The battery accommodation space 5 and the passenger compartment 6 are divided by a vehicle interior trim 7 and a vehicle interior panel 8. In addition, the battery accommodation space 5 and the luggage compartment 4 are divided by a front trunk trim 9. At the left and right sides of a vehicle lateral direction of the battery accommodation space 5 and the luggage compartment 4, side trunk trims 11a and 11b stand between vehicle body panels 10a and 10b.

The battery cooling device 1 of the first embodiment includes an air intake port part 12, a first air intake duct (an air intake pipe) 13, a blower 14, a second air intake duct 15, an air exhaust duct 16 and an air exhaust port 17.

The air intake port part 12 is a port for taking in the air in the passenger compartment, being provided in the vehicle interior trim 7.

The first air intake duct 13 is used for taking in the air from the passenger compartment 6 to the battery 2, being arranged over the battery 2 and extending in the vehicle lateral direction. One end portion of the first air intake duct 13 is connected with the air intake port part 12, and the other end portion thereof is connected with the blower 14.

The first air intake duct 13 is formed like an L shape, consisting of a first member 18 connected with the first air intake port part 12 and a second member 19 connected with the blower 14. Herein, the first member 18 and to the second member 19 may be formed as one unit.

The blower 14 employs a fan that supplies the air taken in from the passenger compartment 6 through the first air intake duct 13 as cooling air, being arranged between the first air intake duct 13 and the second air intake duct 15. The rotation speed of the blower 14 may be variable based on the temperature of the battery module and others.

The second air intake duct 15 is arranged between the blower 14 and the battery 2.

The air exhaust duct 16 discharges the air, which has warmed up while it passes through the battery 2, to the periphery of the air exhaust port 17.

The air exhaust port 17 is an opening provided in the luggage compartment 4, exhausting the air, which is discharged through the air exhaust duct 16, to the exterior of the vehicle.

Figure 3:
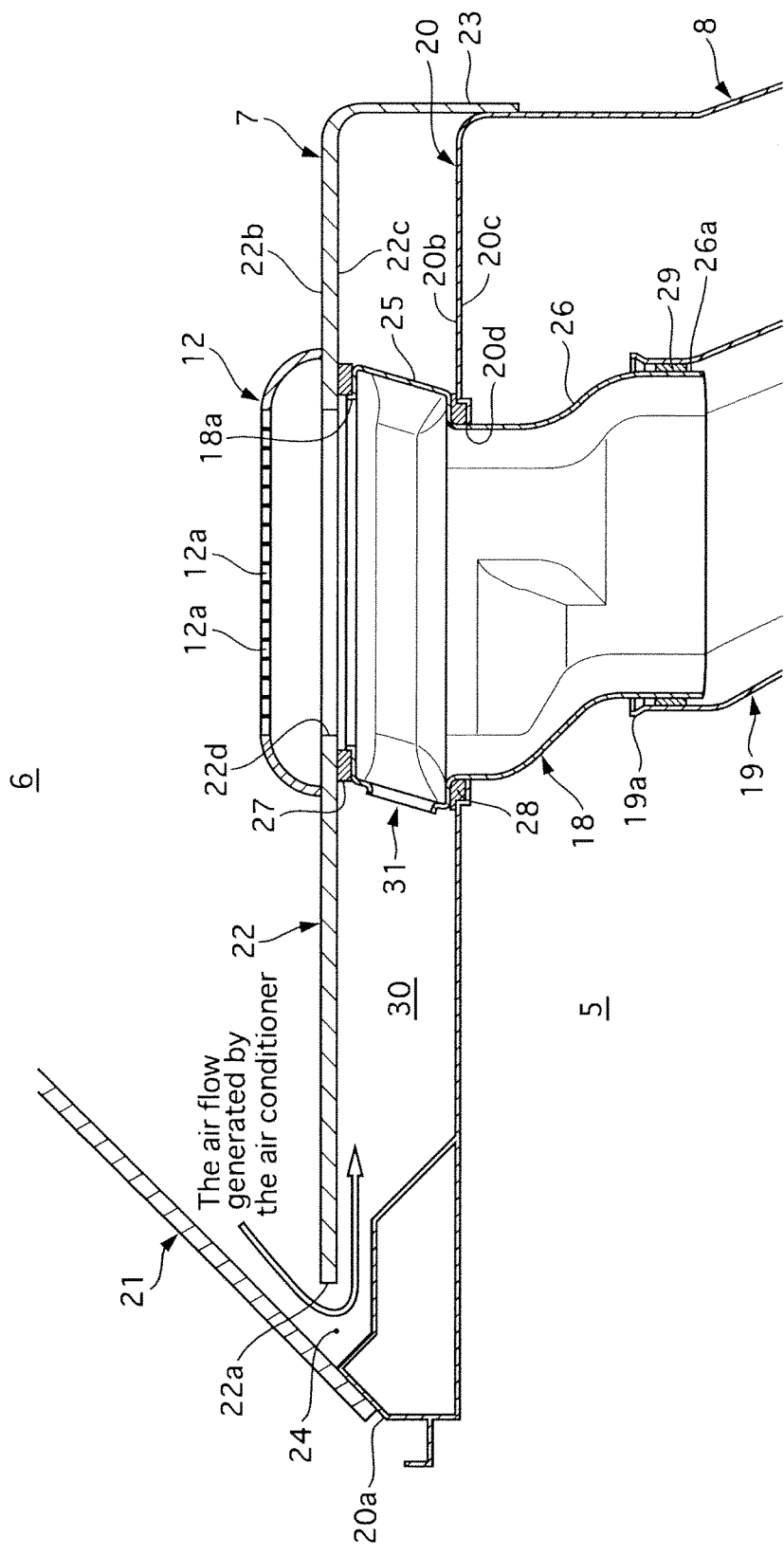
FIG. 3 is a cross sectional right side view of a periphery of a first air intake duct of the first embodiment.

FIG. 3 is a right side view of the periphery of the first air intake duct of the first embodiment.

The vehicle interior panel 8 has a horizontal portion 20 horizontally extending toward the vehicle rear side, and a rear end portion 20a of the horizontal portion 20 supports a lower end portion 21a of a rear window glass 21.

The vehicle interior trim 7 includes a horizontal portion 22 horizontally extending toward the vehicle rear side, and a flange portion 23 bending downwardly from a front end portion of the horizontal portion 22, being formed like an L-letter shape in cross section. The flange portion 23 is fixed on the vehicle interior panel 8. A clearance 24 is formed between a rear end portion 22a of the horizontal portion 22 and the rear window glass 21, extending in a vehicle forward and backward direction.

The air intake port part 12 is fixed by bolts on an upper surface 22b of the horizontal portion 22 of the vehicle interior trim 7. The air intake port part 12 is formed with a plurality of holes 12a to take in the air in the passenger compartment.

Figure 4:
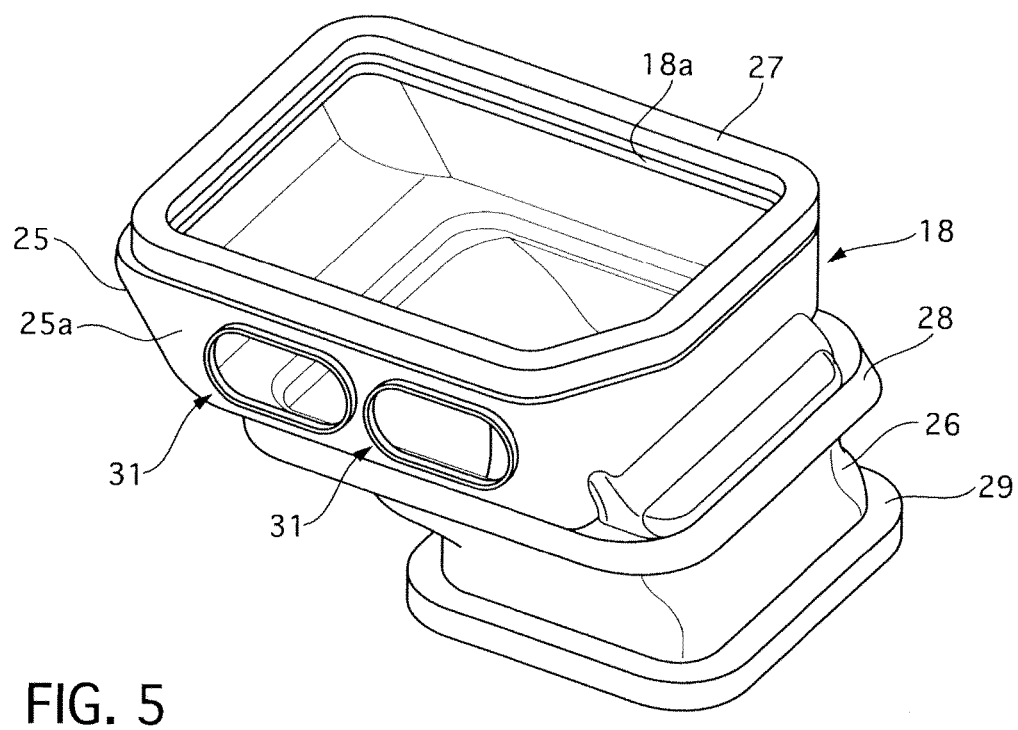
FIG. 4 is a vehicle rear side perspective view of the first air duct showing an auxiliary air intake port of the first embodiment.
Figure 5:
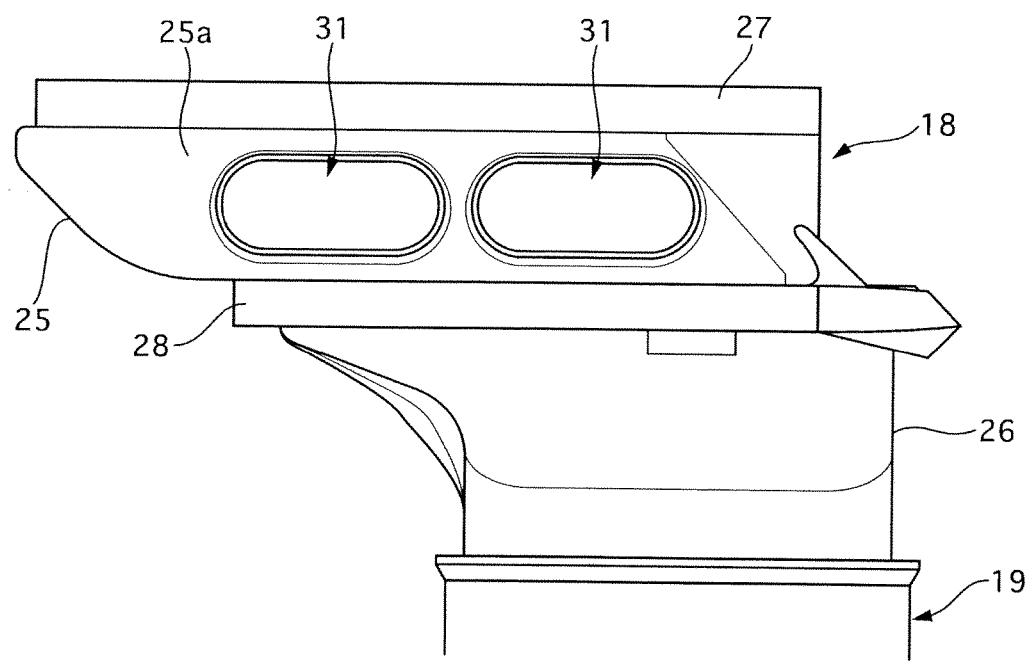
FIG. 5 is a rear view of the first air intake duct showing the auxiliary air intake duct of the first embodiment.
Figure 6:
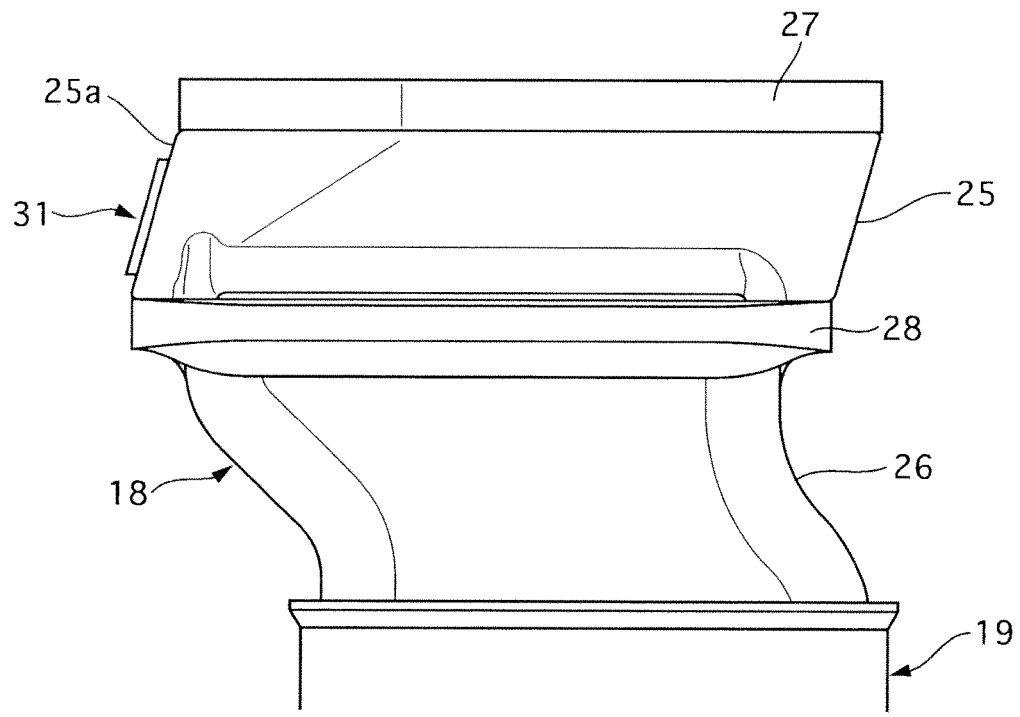
FIG. 6 is a right side view of the first air intake duct showing the auxiliary air intake port of the first embodiment.

As shown in FIG. 4 to FIG. 6, the first member 18 of the first air intake duct 13 has an upper side member 25 and a lower side member 26.

The upper side member 25 is supported, being sandwiched between the horizontal portion 20 of the vehicle interior panel 8 and the horizontal portion 22 of the vehicle interior trim 7, and the member 25 is arranged at the position corresponding to an opening 22d formed in the horizontal to portion 22. The upper side portion 25 is formed at the upper end portion thereof with an opening 18a. The outer diameter of the upper side member 25 is formed larger than the inner diameters of the opening 22d and an opening 20d that is formed in the horizontal portion 20.

A circular seal member 27 is provided between the upper surface of the upper side member 25 and the lower surface 22c of the horizontal portion 22. In addition, a circular seal member 28 is provided between the lower surface of the upper side member 25 and the upper surface 20b of the horizontal portion 20.

The lower side member 26 is arranged at the lower side of the vehicle interior trim 7, namely in the battery accommodation space 5. The lower end portion 26a of the lower side member 26 is engaged with the upper end portion 19a of the second member 19. A circular seal member 29 is provided between the lower end portion 26a and the upper end portion 19a.

Auxiliary air intake ports 31, 31 are formed in the rear surface 25a, which faces toward the rear side of the vehicle, of the upper member 25 to taken in the air into the interior of the first air intake duct 13 from a space 30 formed between the vehicle interior panel 8 and the vehicle interior trim 7. The two auxiliary air intake ports 31, 31 is formed like a long hole extending in the vehicle lateral direction, being arranged alongside in the vehicle lateral direction.

The first member 18 is attached on the vehicle interior panel 8 in advance to the attachment on the vehicle interior trim 7.

Next, the operation of the first embodiment will be explained.

<The Operation to Take in the Air in the Passenger Compartment Through the Auxiliary Air Intake Ports>

In the invention of the above-described patent reference 1, the two air intake ports are formed in the vehicle interior trim, so that, in the case where one of the air intake ports is blocked by luggage, paper, a plastic bag and others, the other one is capable of taking in the air in the passenger compartment into the air intake duct. The air, however, cannot be taken in from the passenger compartment in the case where the both of them are blocked at the same time because the two air intake ports are exposed in the passenger compartment.

Incidentally, the above-described patent reference 1 shows the means for to providing a convex member near the air intake ports and the means for providing an anti-block cover crossing the air intake ports. Although these means can prevent the air intake ports from being blocked, it is not desirable to apply them to real cars because they spoil the appearances.

On the contrary, in the battery cooling device 1 of the first embodiment, the two auxiliary air intake ports 31, 31 are provided in the space 30 formed between the vehicle interior trim 7 and the vehicle interior panel 8. The space 30 and the passenger compartment 6 are communicated with each other through the clearance 24, so that the air can be taken in from the passenger compartment through the auxiliary air intake ports 31, 31 that are not blocked by baggage and others in the case where the air intake port part 12, which exposes in the passenger compartment 6, is blocked.

Therefore, the deterioration in the coolability of battery 2 can be avoided. In addition, the auxiliary air intake ports 31, 31 are located at the rear side of the vehicle interior trim 7, seen from the passenger compartment 6, so that a passenger cannot see them and accordingly the appearance of the passenger compartment 6 is not spoiled.

Further, only the shape of the first air intake duct 13 (addition of the auxiliary air intake ports 31, 31) needs to be changed to obtain the first embodiment, using the conventional structure, so that the processing and the design change of the vehicle interior trim 7 and the vehicle interior panel 8 are not needed. This can suppresses the increase in its cost.

In addition, in the first embodiment, the auxiliary air intake ports 31, 31 are formed in the rear surface 25a, which faces toward the rear side of the vehicle, of the upper side member 25 of the first member 18 constituting the first air intake duct 13. That is, the auxiliary air intake ports 31, 31 are arranged to face toward the clearance 24 that communicates the passenger compartment 6 and the space 30. Herein, when a driver activates the air conditioner in an open air mode (an open air circulating mode), the air in the passenger compartment 6 flows in the space 30 through the clearance 24 to move toward the front side of the vehicle, and then the air flows to the luggage compartment 4, being discharged to the exterior of the vehicle through the air exhaust port 17, as indicated by an arrow in FIG. 3. Thus, the auxiliary air intake ports 31, 31 are faced toward the rear side of the vehicle, so that the air flows into the space 30, and then the air at a low temperature moving toward the front side of the vehicle can be directly taken in the interior of the first air intake duct 13. It is desirable not to taken in the air accumulated in the space 30 as possible, because the air accumulated in the space 30 has the temperature higher than that of the air accumulated in the passenger compartment 6. In other words, the taken-in amount of the air accumulated in the space 30 can be suppressed at the minimum level to improve the coolability by the auxiliary air intake ports 31, 31 being arranged to face the flow-in side of the air in the passenger compartment 6.

Further, in the first embodiment, the two auxiliary air intake ports 31, 31 are provided in the rear surface 25a of the upper side member 25. In the case where only one auxiliary air intake port is provided for example, when the opening area is set large, the rigidity in the upward and downward direction of the upper side member 25 decreases. Accordingly, the upper surface of the upper side member 25 and the lower surface 22c of the horizontal portion 22 might not be sufficiently contacted through the seal member 27, and the sealing performance might be deteriorated. When the sealing performance deteriorates, the temperature of the cooling air rises because the air at the high temperature accumulated in the space 30 flows in the interior of the first air intake duct 13. Further, the deformation might occur due to the reduction in the rigidity.

In the first embodiment, the two auxiliary air intake ports 31, 31 are provided in the vehicle lateral direction, so that the rigidity can be increased by a separated portion of the both auxiliary air intake ports 31, 31 compared to the case where only one auxiliary air intake port is provided. That is, the upper side member 25 can have a necessary rigidity, ensuring the large opening area.

Next, the effects of the first embodiment will be described.

The battery cooling device 1 of the first embodiment has the effects listed below.

(1) The first air intake duct 13 is provided with the auxiliary air intake ports 31 that open to the space 30 formed between the vehicle interior trim 7 and the vehicle interior panel 8 that is located at the passenger-compartment outer side of the vehicle interior trim 7. Therefore, the air in the passenger compartment 6 can be taken in through the auxiliary air intake ports 31, the appearance of the passenger compartment 6 being not spoiled, in the case where the air intake port part 12 exposed in the passenger compartment 6 is blocked. In addition, the processing and the design changes of the vehicle interior trim 7 and the vehicle interior panel 8 are not needed. Therefore, this can suppress the cost-up.

(2) The auxiliary air intake ports 31 open toward the clearance 24 that communicates with the passenger compartment 6, the air can be early taken in from the passenger compartment 6 to the space 30 through the clearance 24, and accordingly the increase in the temperature of the cooling air can be suppressed.

(3) The vehicle interior trim 7 is located over and at the rear side of the rear seat 3, and the auxiliary air intake ports 31 open toward the rear side of the vehicle. Therefore, the air at low temperature, flowing in the space 30 from the passenger compartment 6 and then moving toward the vehicle front side in the interior of the space 30, can be directly taken in, thereby improving the coolability.

(4) The two auxiliary air intake ports 31, 31 are provided, so that the rigidity necessary for the upper side member 25 can be ensured, having the large opening area.

Second Embodiment

Next, a second embodiment will be described. The parts/portions similar to those of the first embodiment are indicated by the same reference numbers and their explanations are omitted.

Figure 7:
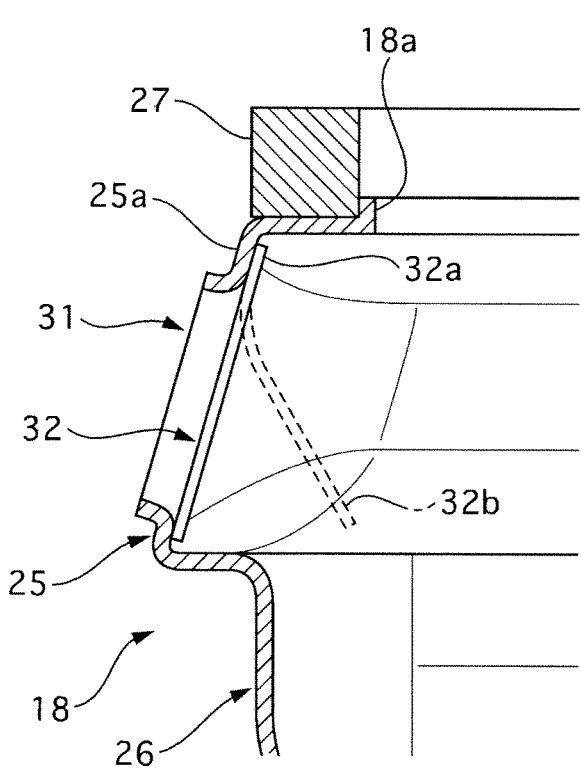
FIG. 7 is a cross-sectional right side view of a first air intake duct showing an auxiliary air intake duct of a second embodiment.

FIG. 7 is a cross sectional right side view of a first air intake duct showing auxiliary air intake ports of the second embodiment.

In the second embodiment, two auxiliary air intake ports 31, 31 are provided with a valve member 32. This construction is different from the first embodiment. The valve member 32 employs a rubber sheet, for example, and the rubber sheets 32 is respectively fixed to block the two auxiliary air intake ports 31, 31 from the inner side of an upper side member 25. The upper end portions 32a of the valve members 32 are fixed on the upper side member 25 so that the valve members 32 can be swung in the upward and downward direction around the center axis of the fixed portion. The material and the thickness of the valve members 32 are set as follows. The valve members 32 maintain at the position indicated by a solid line in FIG. 7, namely at the position where the auxiliary air intake ports 31 are blocked, before the inner pressure the first air intake duct 13 reaches to a predetermined negative pressure. On the other hand, when the inner pressure of the first air intake duct 13 reaches to the predetermined negative pressure, the lower portions 32b of the valve members 32 are separated from the circumferential ridge portions of the auxiliary air intake ports 31. Herein, the predetermined negative pressure is set as the inner pressure of the first air intake port 13 generated when the amount of the cooling air necessary for cooling the battery 2 cannot be obtained due to the whole or partial blocking of the air intake port part 12.

Incidentally, the amount of the cooling air to be supplied to the battery 2 may be obtained by the rotation speed of the blower 14 being increased when the inner pressure of the first air intake duct 13 reaches to the predetermined negative pressure. The inner pressure of the first air intake duct 13 can be easily estimated based on electric current and the like supplied to the motor of the blower 14. In addition, a warning such as a warning lamp may be given to a passenger when the inner pressure of the first air intake duct 13 reaches to the predetermined negative pressure.

The other construction is similar to that of the first embodiment, and accordingly its drawings and descriptions are omitted.

Next, the operation of the second embodiment will be described.

<The Operation to Suppress the Rise in Temperature of the Cooling Air by the Valve Member>

In the battery cooling device 1 of the second embodiment, in the case where the air intake port part 12 is not blocked, the auxiliary air intake ports 31 are blocked by the valve member 32 because the inner pressure of the first air intake duct 13 is lower than the predetermined negative pressure.

Consequently, the air in the passenger compartment 6 is taken in only through the air intake port part 12. As described above, the temperature of the space 30 is higher than that of the passenger compartment 6, and accordingly the auxiliary air intake ports 31 are blocked and the air is directly taken in from the passenger compartment 6 in the case where the auxiliary air intake ports 31 are not needed to be used. Therefore, the cooling air at lower temperature can be supplied to the battery 2, thereby improving the coolability.

On the other hand, in the case where the air intake port part 12 is blocked, the inner pressure of the first air intake duct 13 reaches to the predetermined negative pressure. Consequently, the negative pressure separates the lower portion 32*b* of the valve members 32 from the circumferential ridge portions of the auxiliary air intake ports 31, so that the auxiliary air intake ports 31 open to take in the air in the passenger compartment 6 through the auxiliary air intake ports 31.

In addition, in the second embodiment, the valve member 32 employs the rubber sheet that closes and opens according to the variation of the inner pressure of the first air intake duct 13. Herein, the inner pressure of the first air intake duct 13 varies according to the opening or the closing of the air intake port part 12. As a result, in the second embodiment, the closing and opening operation can be carried out without a power source and sensors. Thus, the auxiliary air intake ports 31 are closed when the air intake port part 12 is not blocked, while the auxiliary air intake ports 31 are opened when the air intake port part 12 is closed. Therefore, the cost when the valve members 32 are added can be suppressed.

Next, the effects of the second embodiment will be described.

In the battery cooling device 1 of the second embodiment has the following effect in addition to the effects (1) to (4) of the first embodiment.

(5) The valve members 32 are provided to close the auxiliary air intake ports 31 before the inner pressure of the first air intake port 13 reaches to the predetermined negative pressure, and to open the auxiliary air intake ports 31 when the inner pressure reaches to the predetermined negative pressure. Therefore, it can improve the coolability in the case where the air intake port part 12 is not blocked.

Third Embodiment

Next, a third embodiment will be described. The parts/portions similar to those of the first embodiment are indicated by the same reference numbers and their explanations are omitted.

Figure 8:
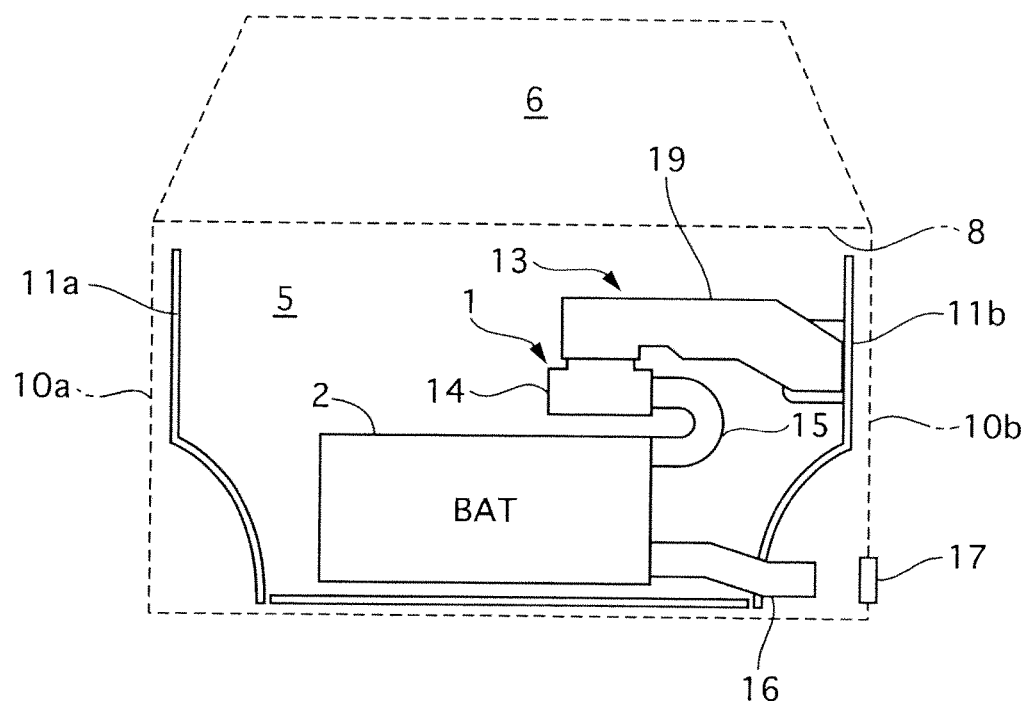
FIG. 8 is a rear view of a vehicle showing a battery cooling device of a third embodiment.
Figure 9:
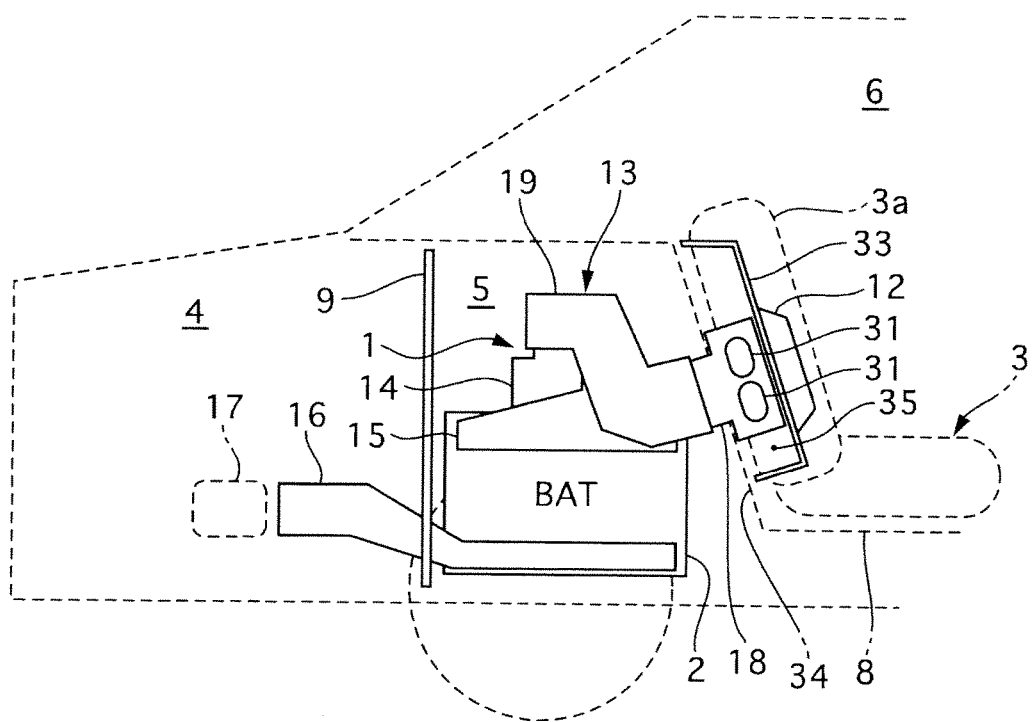
FIG. 9 is a right side view of the vehicle showing the battery cooling device of the third embodiment.
Figure 10:
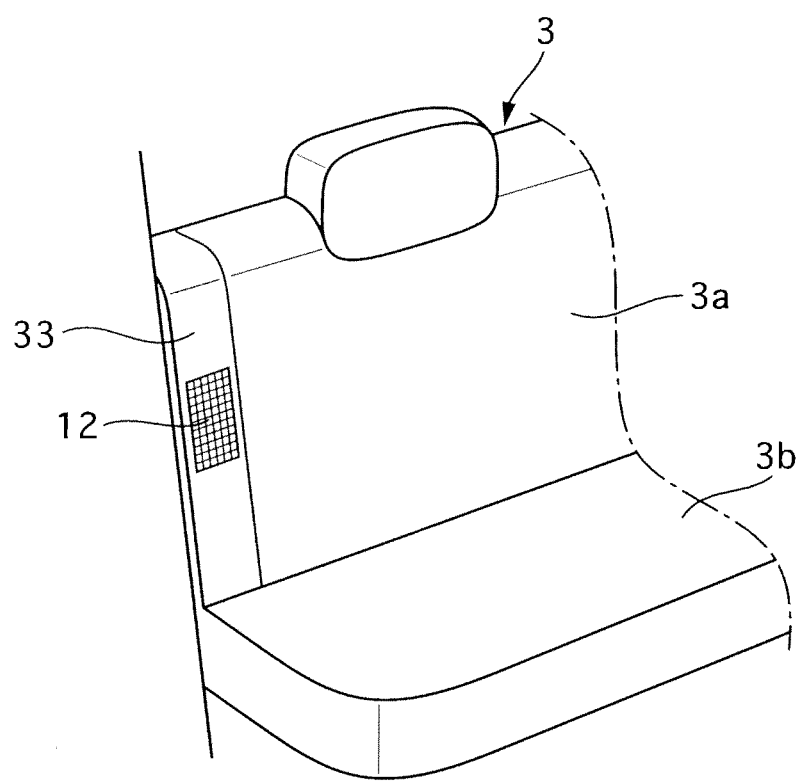
FIG. 10 is a vehicle front side perspective view of a rear seat showing the battery cooling device of the third embodiment.

FIG. 8 is a rear view of a vehicle showing a battery cooling device of the third embodiment, FIG. 9 is a right side view of the vehicle showing the battery cooling device of the third embodiment, and FIG. 10 is a vehicle front side perspective view of a rear seat showing the battery cooling device of the third embodiment.

In the third embodiment, the position of an air intake port part 12 functioning as an inlet port of the air in a passenger compartment 6 is different from that of the first embodiment. The air intake port part 12 is provided in a vehicle interior trim 33 that is located at the right side of a seat back 3*a* of a rear seat 3. According to this structure, a first member 18 of a first air intake duct 13 is provided between the vehicle interior trim 33 and a slanted portion 34 of a vehicle interior panel 8 that is located at a vehicle outer side of the vehicle interior trim 33. In addition, according to the position of the first member 18, a configuration of a second member 19 connecting the first member 18 and a blower 14 with each other is changed.

A space 35 formed between the vehicle interior trim 33 and the slanted portion 34 of the vehicle interior panel 8 is communicated with a passenger compartment 6 at a right end portion of the vehicle interior trim 33. Accordingly, the auxiliary air intake ports 31, 31 of the first member 18 are arranged to face toward the right side in a vehicle lateral direction.

The other construction is similar to that of the first embodiment, and accordingly its drawings and descriptions are omitted.

The battery cooling device 1 of the third embodiment has the operation similar to that of the first embodiment, and the effects similar to those (1), (2) and (4) of the first embodiment.

Other Embodiments

While the embodiments have been described, the present invention is not limited to the embodiments, and the design changes and the modifications are covered by the present invention as long as they do not depart from the subject-matter of the present invention.

For example, although the two auxiliary air intake ports are provided in the embodiments, they may be more than two.

In addition, the auxiliary air intake ports may be provided at appropriate positions as long as the positions ensure the ports to taken in the air in the passenger compartment.

Although the auxiliary air intake ports are formed in an intermediate portion of the first air intake duct in the embodiments, an additional air intake duct may be provided to connect the first air intake duct or the blower with the auxiliary air intake ports.

In addition, although the seal member is provided between the vehicle interior trim and the first air intake duct in the embodiments, the seal member may be provided between the air intake port and the first air intake duct. In this case, for example, a flange portion is provided on the lower end portion of the air intake port part, and the seal member is provided between the lower surface of the flange portion and the upper surface of the first air intake duct.

Although the heat element is a strong electric battery that supplies an electric power to a drive motor of an electric vehicle in the embodiments, it may employ an inverter circuit of the drive motor or other electric equipment.

The invention claimed is:

1. A heat element cooling device, wherein:
air in a passenger compartment is taken in through an air intake port provided in a vehicle interior trim and an air intake pipe to cool a heat element arranged in a heat element accommodation space,
the air intake port is configured to intake air to cool the heat element and to be exposed to the passenger compartment,
an auxiliary air intake port is formed in the air intake pipe and provided to open to a space formed between the vehicle interior trim and a vehicle interior panel, the vehicle interior panel being located at a passenger compartment outer side of the vehicle interior trim,
the auxiliary air intake port is configured to intake air to cool the heat element and to be located at a rear side of the vehicle interior trim seen from the passenger compartment, the space is located at an outer side of the heat element accommodation space and communicated to the passenger compartment, the auxiliary air intake port is configured to receive air from a clearance formed between a horizontal portion of the vehicle interior trim and a rear window glass, and the clearance is communicated with the space and the auxiliary air intake port so as to permit air to flow from the clearance to the space and the auxiliary air intake port.

2. The heat element cooling device according to claim 1, wherein the auxiliary air intake port opens toward a portion communicating with the passenger compartment.

3. The heat element cooling device according to claim 2, wherein the vehicle interior trim is located over and at a rear side of a rear seat, and wherein the auxiliary air intake port opens toward a rear side of a vehicle.

4. The heat element cooling device according to claim 3, wherein the auxiliary air intake port comprises a plurality of ports.

5. The heat element cooling device according to claim 4, wherein a valve member is provided to close the auxiliary air intake port before an inner pressure of the air intake pipe reaches to a predetermined negative pressure, and to open the auxiliary air intake port when the inner pressure reaches to the predetermined negative pressure.

6. The heat element cooling device according to claim 2, wherein the auxiliary air intake port comprises a plurality of ports.

7. The heat element cooling device according to claim 6, wherein a valve member is provided to close the auxiliary air intake port before an inner pressure of the air intake pipe reaches to a predetermined negative pressure, and to open the auxiliary air intake port when the inner pressure reaches to the predetermined negative pressure.

8. The heat element cooling device according to claim 2, wherein a valve member is provided to close the auxiliary air intake port before an inner pressure of the air intake pipe reaches to a predetermined negative pressure, and to open the auxiliary air intake port when the inner pressure reaches to the predetermined negative pressure.

9. The heat element cooling device according to claim 1, wherein the auxiliary air intake port comprises a plurality of ports.

10. The heat element cooling device according to claim 9, wherein a valve member is provided to close the auxiliary air intake port before an inner pressure of the air intake pipe reaches to a predetermined negative pressure, and to open the auxiliary air intake port when the inner pressure reaches to the predetermined negative pressure.

11. The heat element cooling device according to claim 1, wherein a valve member is provided to close the auxiliary air intake port before an inner pressure of the air intake pipe reaches to a predetermined negative pressure, and to open the auxiliary air intake port when the inner pressure reaches to the predetermined negative pressure.

12. The heat element cooling device according to claim 1, wherein the auxiliary air intake port is disposed beneath the horizontal portion of the vehicle interior trim.

13. The heat element cooling device according to claim 1, wherein the auxiliary air intake port is disposed above a first seal member and below a second seal member, the first seal member and the second seal member are communicated with the space, and the first seal member and the second seal member are positioned below the horizontal portion of the vehicle interior trim.

* * * * *